United States Patent
Otsubo

(10) Patent No.: US 10,275,096 B2
(45) Date of Patent: *Apr. 30, 2019

(54) APPARATUS FOR CONTACTLESSLY DETECTING INDICATED POSITION ON REPRODUCED IMAGE

(71) Applicant: Asukanet Company, Ltd., Hiroshima-shi, Hiroshima (JP)

(72) Inventor: Makoto Otsubo, Hiroshima (JP)

(73) Assignee: ASUKANET COMPAN, LTD., HIroshima-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,458

(22) Filed: Jun. 6, 2018

(65) Prior Publication Data

US 2018/0284944 A1 Oct. 4, 2018

Related U.S. Application Data

(63) Continuation of application No. 14/895,387, filed as application No. PCT/JP2013/069169 on Jul. 12, 2013, now Pat. No. 10,019,115.

(30) Foreign Application Priority Data

Jun. 7, 2013 (JP) ................. 2013-120825

(51) Int. Cl.
*G06F 3/042* (2006.01)
*H04N 5/33* (2006.01)

(52) U.S. Cl.
CPC ............ *G06F 3/0421* (2013.01); *G06F 3/042* (2013.01); *G06F 3/0425* (2013.01); *H04N 5/33* (2013.01); *G06F 2203/04108* (2013.01)

(58) Field of Classification Search
CPC .................................................. G06F 3/0421
See application file for complete search history.

(56) References Cited

U.S. PATENT DOCUMENTS

| | | | |
|---|---|---|---|
| 10,019,115 B2 * | 7/2018 | Otsubo | ........... G06F 3/042 |
| 2011/0148820 A1 | 6/2011 | Song | |
| 2014/0240228 A1 | 8/2014 | Juni | |

FOREIGN PATENT DOCUMENTS

| | | |
|---|---|---|
| EP | 1 909 255 A1 | 4/2008 |
| JP | 2000-56928 A | 2/2000 |

(Continued)

OTHER PUBLICATIONS

International Search Report dated Aug. 13, 2013, issued in counterpart Application No. PCT/JP2013/069169 (1 page).

(Continued)

*Primary Examiner* — Amare Mengistu
*Assistant Examiner* — Shawna T Stepp Jones
(74) *Attorney, Agent, or Firm* — Westerman, Hattori, Daniels & Adrian, LLP

(57) ABSTRACT

By forming an infrared light emitting surface 21 on the front side of a display 11, irradiating the infrared light emitting surface 21 with infrared light, forming a reproduced image R2 of the infrared light emitting surface 21 at a position of a reproduced image R1, and photographing, through an infrared camera 26 provided at the back of the reproduced image R1, reflected light from the reproduced image R2 of the infrared light emitting surface 21 in the case where an indicating means such as a finger indicates the reproduced image R1, a position of the indicating means in contact with the reproduced image R1 becomes detected. An extremely hygienic method and apparatus for contactlessly detecting an indicated position on a reproduced image with which an input without touching a display is enabled can thereby be provided.

3 Claims, 3 Drawing Sheets

(56) References Cited

FOREIGN PATENT DOCUMENTS

| JP | 2006-39745 A | 2/2006 |
| JP | 2008-204047 A | 9/2008 |
| JP | 4734652 B2 | 7/2011 |
| JP | 5036898 B2 | 9/2012 |
| JP | 2013-069272 A | 4/2013 |

OTHER PUBLICATIONS

Extended Supplementary Partial European Search Report dated Apr. 25, 2017, issued in counterpart European Patent Application No. 13886370.9. (9 pages).

Office Action dated Jul. 12, 2017, issued in counterpart Chinese application No. 2013-80077094.6, with English Translation. (11 pages).

* cited by examiner

APPARATUS FOR CONTACTLESSLY DETECTING INDICATED POSITION ON REPRODUCED IMAGE

CROSS-REFERENCE TO RELATED APPLICATIONS

This application is a Continuation of U.S. patent application Ser. No. 14/895,387, filed on Dec. 2, 2015, which is a national stage application filed under 35 USC 371 of International Application No. PCT/JP2013/069169, filed Jul. 12, 2013, and which is based upon and claims the benefit of Priority from the prior Japanese Patent Application No. 2013-120825, filed on Jun. 7, 2013, the entire contents of which are incorporated herein by reference.

TECHNICAL FIELD

The present invention relates to a method and an apparatus for contactlessly detecting an indicated position on a reproduced image in which a real image becomes formed in the air and a signal can be input by looking at this real image (e.g., a touch-panel image) and through an operation of an indicating means (e.g., a finger).

BACKGROUND ART

It has been known from the past that when displaying an image on a display and pressing a particular position on the image with a finger, X and Y coordinates of the pressed part become detected by a pressure-sensitive sensor and the like, and by this input signal, the next behavior is performed (See e.g., Patent Literature 1).

Additionally, as described in Patent Literature 2, when a matrix is formed by numerously and parallelly arranging light-emitting elements and light-receiving elements along X and Y axes immediately above a display and the surface of the display is touched with an obstacle such as a finger and a pen, it is also proposed to detect a position having come into direct contact with the display by the obstacle cutting across the matrix.

On the other hand, in Patent Literature 3, there is disclosed a technique to form an image of an object arranged on one side as a real image on the other side by arranging a first light control panel in which a number of first planar light-reflective portions are arranged in parallel with one another at constant intervals inside a transparent flat plate and a second light control panel in which a number of second planar light-reflective portions are arranged in parallel with one another at constant intervals inside another transparent flat plate in direct contact or contiguity with each other in a way that makes the first planar light-reflective portions and the second planar light-reflective portions orthogonal in planar view.

CITATION LIST

Patent Literature

Patent Literature 1: Japanese Unexamined Patent Application Publication No. 2006-039745
Patent Literature 2: Japanese Unexamined Patent Application Publication No. 2000-056928
Patent Literature 3: Japanese Patent No. 5036898

SUMMARY OF INVENTION

Technical Problem

However, in the case of touch panels described in Patent Literatures 1 and 2, they had a structure in which a planar display existed on the back side, a particular planar image became displayed on the display, and an input position was detected by pressing a particular position on the display. Therefore, when pressing an image with a finger, a pen and the like, they inevitably came into contact with or hit a display surface, and there have been cases where the display became dirty or scratched.

Additionally, touch panels having displays are used for ATMs and the like, however, since a large indefinite number of people touch screens, they are not hygienic, and they have not been effective for the prevention of contact infection.

Also, when light is irradiated toward the displays, reflected light thereof becomes emitted from the displays, and there have been cases where it becomes hard to look at the displays. In Patent Literature 3, there is proposed an optical imaging apparatus, however, there is no mention made of application of the optical imaging apparatus to a touch panel and the like.

The present invention has been made in view of the above circumstances, and an object thereof is to provide extremely hygienic method and apparatus for contactlessly detecting an indicated position on a reproduced image with which an image to be formed is made to be a spatial image that is not reflected light from other light sources, by indicating a specific position on the spatial image through an indicating means such as a finger, a pointer, a pen and the like, the indicated position becomes input, and signal input is enabled without touching a display.

Solution to Problem

In order to achieve the above object, according to a first aspect of the present invention, there is provided a method for contactlessly detecting an indicated position on a reproduced image, including: using a light control means including: a number of first minute reflective surfaces arranged standing on a same plane surface; a number of second minute reflective surfaces arranged standing on another same plane surface, the first minute reflective surfaces and the second minute reflective surfaces being crossed in planar view; and second reflected light formed by receiving first reflected light from the respective first minute reflective surfaces on the respective corresponding second minute reflective surfaces, the method for contactlessly detecting an indicated position on a reproduced image, further including: 1) displaying an image on a display provided on one side of the light control means as a reproduced image R1 in a space on the other side of the light control means; 2) forming an infrared light emitting surface on the front side of the display and forming, at the position of the reproduced image R1, a reproduced image R2 of the infrared light emitting surface formed by means of the light control means; and 3) detecting an operation position on the reproduced image R1 by means of reflected light from the reproduced image R2.

Additionally, in the case of the method for contactlessly detecting an indicated position on a reproduced image according to the first aspect of the present invention, it is preferable for the infrared light emitting surface to be provided with an irregular reflection surface for infrared light that irregularly reflects infrared light from an infrared light irradiating means provided at a different position. Here, the infrared light irradiating means can be that which irradiates infrared light to the whole of the irregular reflection surface for infrared light, or it can also be that which irradiates infrared light to the irregular reflection surface for infrared light by high-speed scanning the infrared light.

In the case of the method for contactlessly detecting an indicated position on a reproduced image according to the first aspect of the present invention, it is preferable for the detection of the operation position on the reproduced image R1 to be performed by an infrared camera that receives reflected light from the reproduced image R2. Here, it is preferable for the infrared camera to be a two-dimensional camera (or an infrared sensor) that does not detect visible light. The operation position on the reproduced image R1 (operated by e.g., a finger and the like) becomes detected as reflected light from the reproduced image R2. The position may alternatively be specified by a two-dimensional image of the infrared camera.

In the case of the method for contactlessly detecting an indicated position on a reproduced image according to the first aspect of the present invention, it is preferable for the reproduced image R1 to be a real image of a touch panel. Consequently, when a finger and the like touches part of the touch panel displayed in the air as a real image, the touched position becomes an operation position and infrared light reflects, and the operation position becomes detected by an infrared camera.

According to a second aspect of the present invention, in the case of an apparatus for contactlessly detecting an indicated position on a reproduced image, including: using a light control means including: a number of first minute reflective surfaces arranged standing on a same plane surface; a number of second minute reflective surfaces arranged standing on another same plane surface, the first minute reflective surfaces and the second minute reflective surfaces being crossed in planar view; and second reflected light formed by receiving first reflected light from the respective first minute reflective surfaces on the respective corresponding second minute reflective surfaces; and displaying an image on a display provided on one side of the light control means as a reproduced image R1 in a space on the other side of the light control means, the apparatus for contactlessly detecting an indicated position on a reproduced image, further including:
forming a reproduced image R2 of an infrared light emitting surface at a position of the reproduced image R1 by forming the infrared light emitting surface on the front side of the display; detecting an operation position on the reproduced image R1 by receiving reflected light from the reproduced image R2 through an infrared camera; and detecting the position of an indicating means in contact with the reproduced image R1.

In the case of the apparatus for contactlessly detecting an indicated position on a reproduced image according to the second aspect of the present invention, the infrared light emitting surface can be that which is composed of an irregular reflection surface for infrared light formed on the front side of the display and irradiated with infrared light through an infrared light irradiating means (including simultaneous irradiation on all positions and scanning irradiation) located at a different position, or the irregular reflection surface for infrared light can be formed directly on the surface of the display. Also, depending on circumstances, infrared light can be made to be emitted directly from the surface of the display.

In the case of the methods and the apparatuses for contactlessly detecting an indicated position on a reproduced image according to the first and the second aspects of the present invention, it is preferable for the light control means to be arranged at an angle range of 40 to 50 degrees with respect to the display. Additionally, the reproduced image R1 becomes formed at a position symmetrical to an image on the display with respect to the light control means.

In the case of the methods and the apparatuses for contactlessly detecting an indicated position on a reproduced image according to the first and the second aspects of the present invention, as the light control means, one described in Japanese Patent No. 5036898 can be used, and one described in Japanese Patent No. 4734652 in which unitary optical elements each having two orthogonal light reflective surfaces are planarly arranged can also be used.

In the case of the methods and the apparatuses for contactlessly detecting an indicated position on a reproduced image according to the first and the second aspects of the present invention, the infrared camera can be replaced by an infrared sensor capable of detecting a two-dimensional position. In this case, as this infrared camera, it is preferable to use one that does not sense light (visible light) contained in a reproduced image.

In the case of the apparatus for contactlessly detecting an indicated position on a reproduced image according to the second aspect of the present invention, the infrared light emitting surface can be replaced by the irregular reflection surface for infrared light and can be formed on a different panel arranged on the front side of the display.

In the case of the apparatus for contactlessly detecting an indicated position on a reproduced image according to the second aspect of the present invention, there are cases where the irregular reflection surface for infrared light is formed directly on the surface of the display.

In the case of the methods and the apparatuses for contactlessly detecting an indicated position on a reproduced image according to the first and the second aspects of the present invention, the reproduced image R1 can be a touch-panel image or a keyboard image in which a plurality of switches are displayed.

Advantageous Effects of Invention

In the case of the methods and the apparatuses for contactlessly detecting an indicated position on a reproduced image according to the present invention, an image on the display provided on one side of the light control means is displayed as a reproduced image R1 in a space on the other side of the light control means, the infrared light emitting surface is formed on the front side of the display, and a reproduced image R2 of the infrared light emitting surface becomes formed (imaged) at the position of the reproduced image R1. When operating the reproduced image R1 (by an indicating means), infrared light that indicates an operation position reflects from the reproduced image R2 of the infrared light emitting surface. Thus, by photographing the reproduced image R2 with an infrared camera, the position of the indicating means becomes detected. An input position of the indicating means thereby becomes detected by touching the reproduced image R1 formed in the air.

Also, in the case of the apparatuses for contactlessly detecting an indicated position on a reproduced image according to the present invention, since the reproduced image R1 is displayed in a space, and unlike the conventional way, a finger, a hand and the like do not come into contact with the panel, they are extremely hygienic.

Additionally, since there is no need to physically press a finger and the like against an image, scratches and the like do not become caused to a screen. Moreover, since a reproduced image is not displayed on a liquid crystal panel and the like, and is formed independently in a space, there is no reflected light from the reproduced image.

DESCRIPTION OF EMBODIMENTS

Figure 1:
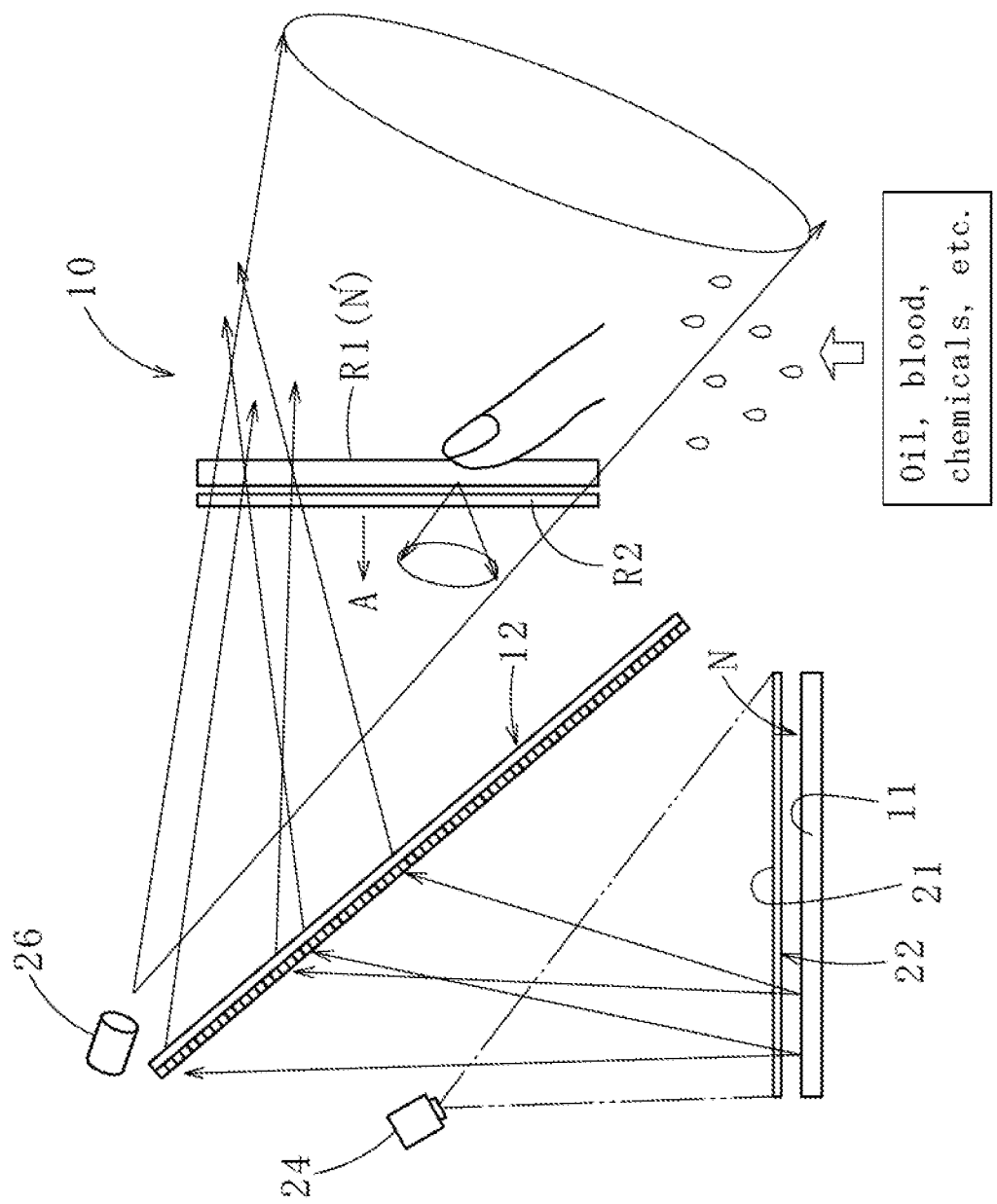
FIG. 1 is an explanatory diagram of an apparatus for contactlessly detecting an indicated position on a reproduced image according to a first embodiment of the present invention.
Figure 2:
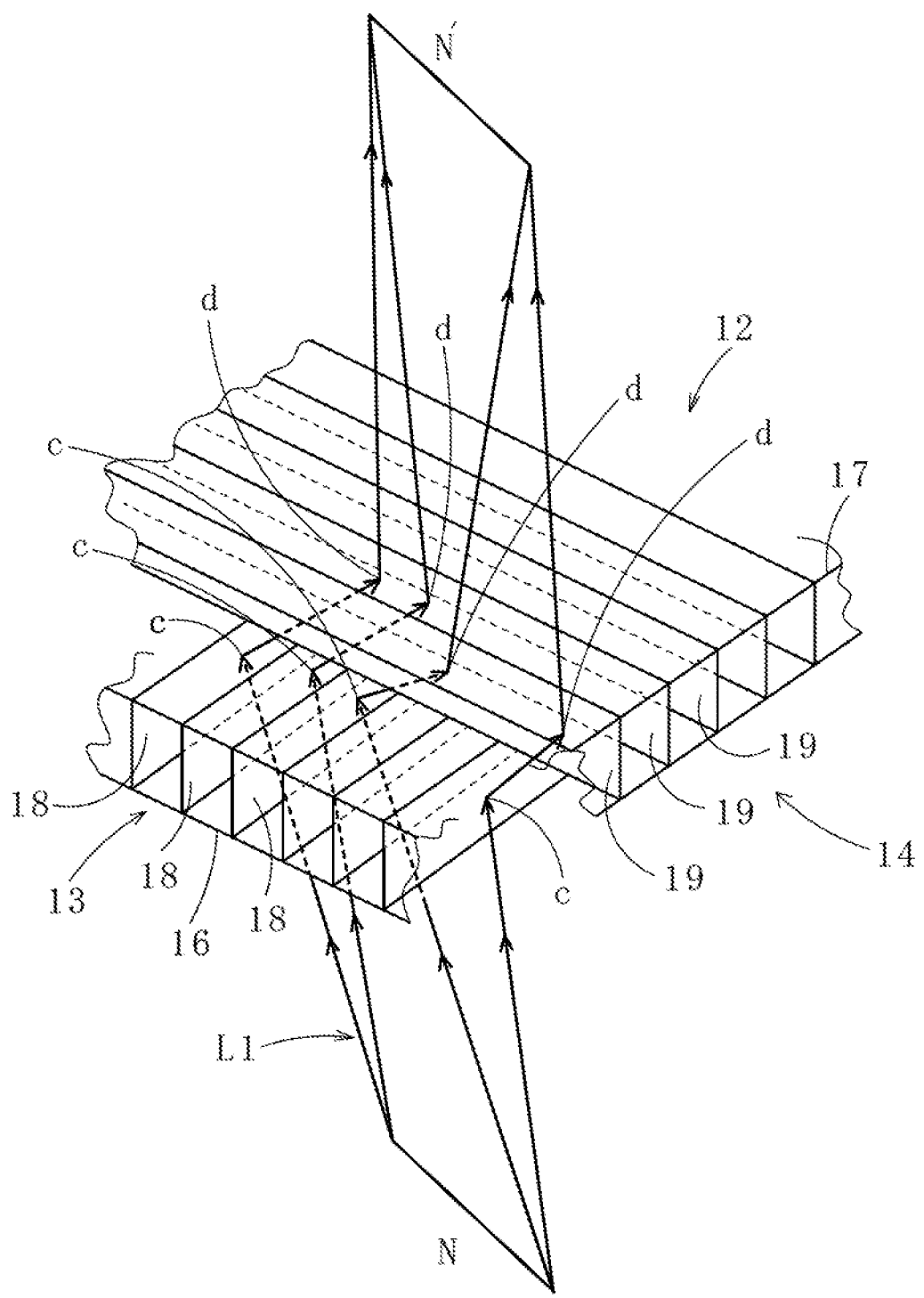
FIG. 2 is an explanatory diagram of a light control means of the same apparatus for contactlessly detecting an indicated position on a reproduced image.

Next, with reference to the accompanying drawings, descriptions will be given on embodiments of the present invention. As illustrated in FIGS. 1 and 2, an apparatus for contactlessly detecting an indicated position on a reproduced image 10 according to one embodiment of the present invention is provided with a light control means 12 that is formed at an angle of 40 to 50 degrees with respect to a display 11, and that forms an image on the display 11 at a symmetrical position.

The light control means 12 is, as illustrated in detail in FIG. 2, formed by placing a first light control panel 13 and a second light control panel 14 face to face with each other with one side of each of the first and the second light control panels 13 and 14 either in direct contact with each other or having a space in between them. The first light control panel 13 is formed by arranging a number of band-like planar light-reflective portions 18 at a constant pitch and perpendicularly to a face on one side of a transparent flat plate 16 of constant thickness, and the second light control panel 14 is formed by arranging a number of band-like planar light-reflective portions 19 at a constant pitch and perpendicularly to a face on one side of another transparent flat plate 17 of constant thickness. Here, the planar light-reflective portions 18 of the first light control panel 13 and the planar light-reflective portions 19 of the second light control panel 14 are arranged in a crossed state (in this embodiment, in an orthogonal state) in planar view. A method for making this light control means 12 is described in detail in Patent Literature 3.

Behaviors of this light control means 12 will be described with reference to FIG. 2. Light L1 emitted from an object N (e.g., an image on the display 11 provided on one side of the light control means 12) reflects off points c of the planar light-reflective portions 18 of the first light control panel 13, subsequently reflects off points d of the planar light-reflective portions 19 of the second light control panel 14, and forms a real image N' at a position outside of the light control means 12 (in a space on the other side). Therefore, by using an image display apparatus (optical imaging apparatus) having this light control means 12, an image on the display 11 can be displayed as a reproduced image R1 in a space.

Here, the planar light-reflective portions 18 of the first light control panel 13 to be divided by pitches between the planar light-reflective portions 19 of the second light control panel 14 in planar view form first minute reflective surfaces, and the planar light-reflective portions 19 of the second light control panel 14 to be divided by pitches between the planar light-reflective portions 18 of the first light control panel 13 in planar view form second minute reflective surfaces. Therefore, the first minute reflective surfaces and the second minute reflective surfaces crossed in planar view are numerously arranged standing on one plane surface and on another plane surface, respectively, and light emitted from the object N reflects off the first minute reflective surfaces (i.e., first reflected light), re-reflects off the corresponding second minute reflective surfaces (i.e., second reflected light), and forms the real image N'.

In the case of the apparatus for contactlessly detecting an indicated position on a reproduced image 10, on the front side of the display 11, a transparent sheet 22 provided with an irregular reflection surface for infrared light 21 (an example of infrared light emitting surfaces) that irregularly reflects infrared light is arranged. When a space between the display 11 and the transparent sheet 22 is large, an image on the display 11 becomes out of focus, and thus it is preferable for a distance between the transparent sheet 22 and the surface of the display 11 to be as small as possible. The transparent sheet 22 can be in direct contact with the display 11, or the irregular reflection surface for infrared light 21 can be formed directly on the surface of the display 11. Also, the transparent sheet 22 is made of a panel different from that of the display 11, and can be a piece of glass or a piece of transparent plastic. Additionally, that which is devised so as to make infrared light emitted directly from the surface of a display can be used alternatively. As the infrared light emitting surface, in some cases, infrared light is emitted from the display itself (the surface).

At a portion obliquely above the display 11, an infrared light generating means (i.e., an infrared light irradiating means, e.g., an infrared lamp, an infrared-emitting diode) 24 that irradiates the irregular reflection surface for infrared light 21 with infrared light becomes arranged. In this case, it is preferable for light from the infrared light generating means 24 not to contain visible light. Therefore, as the infrared light generating means 24, it is desirable to use a single or a plurality of infrared diode(s) and the like. Also, infrared light can be that which becomes high-speed scanned.

Light from this irregular reflection surface for infrared light 21 (an image on the irregular reflection surface for infrared light 21), through the light control means 12, forms a reproduced image R2 made from a real image thereof on the back side (A side) of or on the same surface as a reproduced image R1 made from a real image.

On the other hand, a two-dimensional camera 26 capable of photographing the reproduced image R2 from behind and confirming the position thereof (X and Y coordinates) is provided at a position above the light control means 12. As this two-dimensional camera 26, it is preferable to use an infrared camera that detects only infrared light and does not detect visible light.

By including the above-described display 11 having the transparent sheet 22 provided with the irregular reflection surface for infrared light 21, and by also including the above-described light control means 12, infrared light generating means 24 and two-dimensional camera 26, the apparatus for contactlessly detecting an indicated position on a reproduced image 10 is formed.

Consequently, for example, when an image N of an operation panel (a touch-panel image in which a plurality of switches are displayed) is displayed on the display 11, a reproduced image R1 of the touch panel (a real image N' of the operation panel) becomes formed in the air, and on the back side of the reproduced image R1, a reproduced image R2 of the irregular reflection surface for infrared light 21 becomes formed. Here, when a worker presses the reproduced image R1 of the touch panel with his/her finger, a rod-like object and the like (examples of indicating means), the reproduced image R2 of the irregular reflection surface for infrared light 21 inevitably becomes pressed at the same time. Reflected infrared light from the finger is thereby photographed by the two-dimensional camera 26, and the position of the finger becomes confirmed. Then, the position on the touch panel (e.g., a button on the operation panel) pressed by the worker becomes detected. Therefore, even when a finger and the like are dirty due to the adherence of oil, blood, chemicals and the like, inputting through the touch panel can be performed without any problem.

Next, with reference to FIG. 3, descriptions will be given on an apparatus for contactlessly detecting an indicated position on a reproduced image 30 according to a second embodiment of the present invention. Components same as those of the apparatus for contactlessly detecting an indicated position on a reproduced image 10 according to the first embodiment will be indicated by the same numerals and signs, and detailed descriptions on them will be omitted.

On the under side (i.e., one side) of a light control means 12, a display 11 is arranged, and on the surface of the display 11, a transparent sheet 22 having an irregular reflection surface for infrared light 21 is provided in contiguity or in direct contact with the display 11. The transparent sheet 22 is irradiated with infrared light by an infrared light generating means 24.

Therefore, an image on the display 11, by the light control means 12, becomes reproduced (imaged) as a reproduced image R1 of the display 11 at a position symmetrical about the light control means 12, and a reproduced image R2 of the irregular reflection surface for infrared light 21 becomes formed right in front of the reproduced image R1. A two-dimensional camera 26 that detects this reproduced image R2 of the irregular reflection surface for infrared light 21 is provided at a position above the light control means 12.

Therefore, when an image of a touch panel is formed on the display 11, a reproduced image R1 of the image on the display 11 becomes formed in a space portion. When pressing this reproduced image R1, infrared light becomes reflected, and by photographing the reflected light through the two-dimensional camera 26, the position (X, Y) becomes detected. An operation position on the touch panel is thereby found.

In the case of the apparatuses for contactlessly detecting an indicated position on a reproduced image 10 and 30 according to the first and the second embodiments, the two-dimensional camera 26 is, with the light control means 12 as a reference point, arranged on the side opposite to the display 11, i.e., the side on which reproduced images R1 and R2 become formed. However, the two-dimensional camera 26 can also be arranged on the display 11 side.

Figure 3:
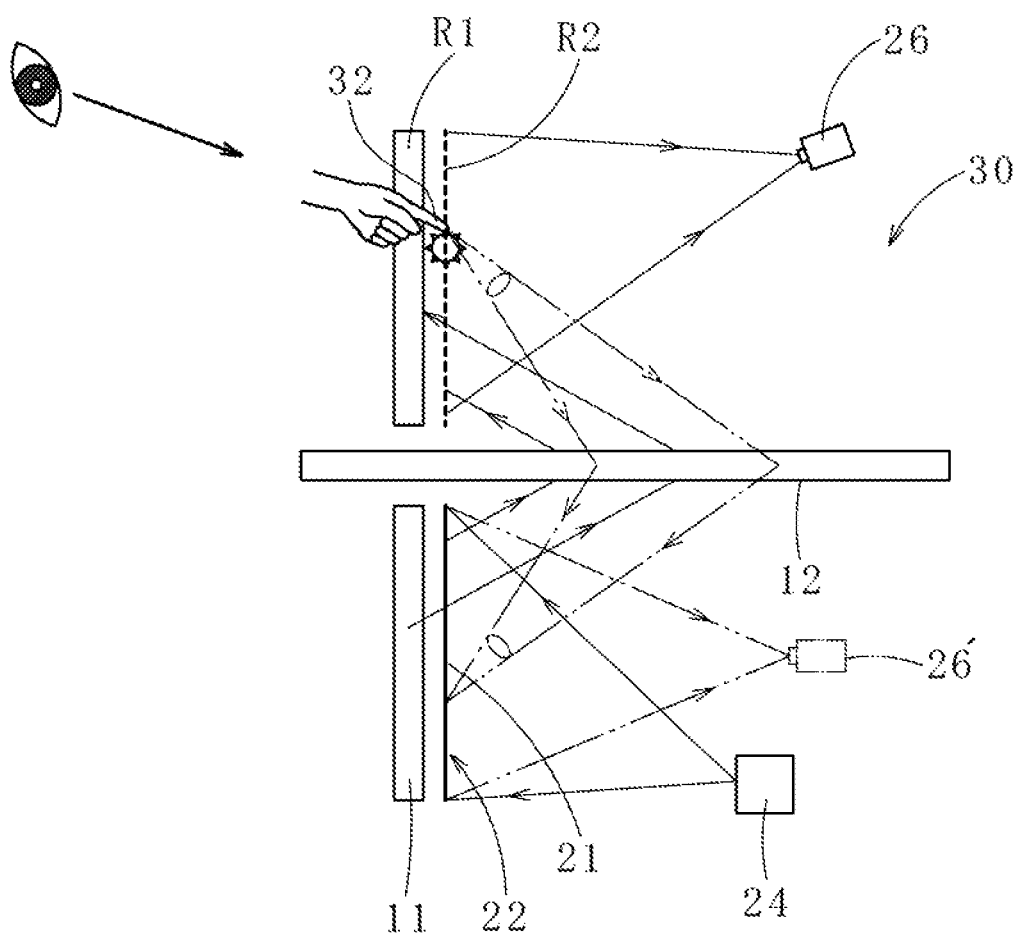
FIG. 3 is an explanatory diagram of an apparatus for contactlessly detecting an indicated position on a reproduced image according to a second embodiment of the present invention.

This embodiment is illustrated by chain double-dashed lines in FIG. 3. When an indicating means (e.g., a finger 32) is brought into direct contact with the reproduced image R2 of the irregular reflection surface for infrared light 21 from behind, reflected infrared light, through the light control means 12, becomes formed on the irregular reflection surface for infrared light 21. By detecting this image through a two-dimensional camera 26' that detects only infrared light and arithmetically calculating the position of this image, a position operated by the finger 32 becomes found.

Additionally, it is also possible to make clear the position of the finger 32 by placing a slit and the like on top of the irregular reflection surface for infrared light 21.

The present invention is not limited to the above embodiments, and also applies to cases where other publicly known techniques are used. For example, one in which mirrors crossed longitudinally and laterally or cubic mirrors are arranged can be used as the light control means as well. Additionally, the irregular reflection surface for infrared light is formed on the front side of the transparent sheet, however, it can be formed on the back side of the transparent sheet or on the surface or inside of the display instead.

INDUSTRIAL APPLICABILITY

In the case of the methods and the apparatuses for contactlessly detecting an indicated position on a reproduced image according to the present invention, when used for control panels of various machines, a reproduced image of an operation panel having operation buttons (e.g., a touch panel) becomes displayed in a space, and by pressing the operation buttons, input signals become obtained. Additionally, since a reproduced image formed in a space is not directly touched, a screen does not become scratched or dirty. Therefore, the methods and the apparatuses for contactlessly detecting an indicated position on a reproduced image according to the present invention are usable not only for operation panels of factory machines, but also optimally for touch panels of mobile phones, personal computers, automobiles, vessels and the like.

REFERENCE SIGNS LIST

10: apparatus for contactlessly detecting an indicated position on a reproduced image, 11: display, 12: light control means, 13: first light control panel, 14: second light control panel, 16, 17: transparent flat plate, 18, 19: planar light-reflective portion, 21: irregular reflection surface for infrared light, 22: transparent sheet, 24: infrared light generating means, 26, 26': two-dimensional camera, 30: apparatus for contactlessly detecting an indicated position on a reproduced image, 32: finger, R1, R2: reproduced image

The invention claimed is:

1. An apparatus for contactlessly detecting an indicated position on a reproduced image, comprising:
   a light control means including a number of first minute reflective surfaces arranged standing on a same plane surface, and a number of second minute reflective surfaces arranged standing on another same plane surface, the first minute reflective surfaces and the second minute reflective surfaces being crossed in planar view, and second reflected light being formed by receiving first reflected light from the respective first minute reflective surfaces on the respective corresponding second minute reflective surfaces;
   a display provided on one side of the light control means displaying an image that is reproduced through the light control means as a reproduced image R1 in a space on the other side of the light control means;
   an infrared light emitting surface disposed on a front side of the display and having an irregular reflection surface for infrared light;
   an infrared light irradiating means provided at a different position than the infrared light emitting surface, the infrared light irradiating means irradiating infrared light at the infrared light emitting surface which reflects the infrared light through the light control means to form a reproduced image R2 adjacent a position of the reproduced image R1; and an infrared camera detecting a position of an indicating means in contact with the reproduced image R1 by receiving reflected light from the reproduced image R2, wherein the light control means is arranged at an angle of 90 degrees with respect to the display.

2. The apparatus for contactlessly detecting an indicated position on a reproduced image according to claim 1, wherein the infrared light emitting surface is formed on a panel different from the display, the panel being arranged on the front side of the display.

3. The apparatus for contactlessly detecting an indicated position on a reproduced image according to claim 1, wherein the irregular reflection surface for infrared light is formed directly on the surface of the display.

\* \* \* \* \*